United States Patent [19]
Noutomi et al.

[11] Patent Number: 5,921,569
[45] Date of Patent: Jul. 13, 1999

[54] TORSION BAR POSITIONING STRUCTURE

[75] Inventors: Shinya Noutomi, Tokyo; Takashi Tsutsumi, Hiratsuka; Masao Kiyota, Zama, all of Japan

[73] Assignee: Nissan Motor Co., Ltd., Yokohama, Japan

[21] Appl. No.: 08/896,801

[22] Filed: Jul. 18, 1997

[30] Foreign Application Priority Data

Jul. 19, 1996 [JP] Japan ................................. 8-190887

[51] Int. Cl.⁶ .................................................. B60G 11/20
[52] U.S. Cl. ........................... 280/124.167; 280/124.137; 267/277
[58] Field of Search ....................... 280/124.13, 124.137, 280/124.167; 267/273, 277, 278

[56] References Cited

U.S. PATENT DOCUMENTS

| 2,631,844 | 3/1953 | Paton . | |
|---|---|---|---|
| 4,635,958 | 1/1987 | Yonemoto | 267/57 |
| 5,609,331 | 3/1997 | Hoag et al. | 267/278 |
| 5,685,527 | 11/1997 | Harbali et al. | 267/277 |
| 5,707,050 | 1/1998 | Pfundstein | 267/277 |

FOREIGN PATENT DOCUMENTS 61-24305  2/1986  Japan .

*Primary Examiner*—Paul N. Dickson
*Attorney, Agent, or Firm*—Foley & Lardner

[57] ABSTRACT

A sleeve joined to a torsion bar passes through a through hole in a side wall plate fixed to a vehicle body. The sleeve comprises two projections. The shape and dimensions of the through hole are such that one of the projections can pass through the through hole at a predetermined rotation position. After this projection has passed through the through hole, the sleeve is rotated to a predetermined fixed angle. As the displacement of the sleeve in an axial direction is limited by the two projections the position of the sleeve in an axial direction is always constant.

14 Claims, 8 Drawing Sheets

5,921,569

TORSION BAR POSITIONING STRUCTURE

FIELD OF THE INVENTION

This invention relates to the attachment to a vehicle body of a torsion bar used in a vehicle suspension.

BACKGROUND OF THE INVENTION

In a vehicle suspension which uses a torsion bar, an end of the torsion bar is supported by a vehicle body via an anchor arm as disclosed in Jikkai Sho 61-24305 published in 1987 by the Japanese Patent Office. The anchor arm comprises a sleeve fitted to the end of the torsion bar and an arm which projects in a vertical direction from the sleeve.

The sleeve passes through a cross member forming part of the vehicle body, one end of the torsion bar is inserted in the sleeve and the other end of the torsion bar is attached to a suspension arm.

The relative rotation of the torsion bar and sleeve is limited by serration or the like. A snap ring is fitted onto the outer circumference of the sleeve passing through the cross member so that the sleeve does not fall off the cross member. The cross member that has a U-shaped cross section, and a bracket for fixing the arm to the member projects from a lateral wall plate of the member.

The arm is fixed to this bracket by an anchor-bolt and nut. This limits the rotation of the sleeve and torsion bar.

In this anchor arm, when fixing the arm to the bracket, the bolt holes of the arm and bracket have to be aligned while adjusting the position of the sleeve in a axial direction, and some time was therefore required to attach the arm to the bracket of the anchor-bolt.

SUMMARY OF THE INVENTION

It is therefore an object of this invention to facilitate positioning of a sleeve of an anchor arm in the axial direction when a torsion bar is attached to a vehicle body.

It is a further object of this invention to reduce the number of parts and work necessary to attach a torsion bar to a vehicle body.

In order to achieve the above objects, this invention provides a positioning structure for joining a torsion bar supporting a suspension arm on a vehicle body, to the vehicle body at a predetermined position in an axial direction of the torsion bar.

The positioning structure comprises a sleeve joined to one end of the torsion bar, a side wall plate fixed to the vehicle body, and two projections projecting from the sleeve on both sides of the side wall plate, wherein a through hole is formed in the side wall plate so as to allow the passage of one of the projections at a predetermined rotation position of the sleeve.

It is preferable that one of the projections is formed longer than the other of the projections, the shorter of the projections is able to pass through the through hole at the predetermined rotation position, and the longer of the projections is unable to pass through the through hole.

It is also preferable that the sleeve has an arm projecting in a radial direction from an outer circumference of the sleeve, this arm being fixed to the side wall plate so as to prevent the sleeve from rotating.

This invention also provides a positioning structure comprising a pair of side wall plates fixed to the vehicle body, these wall plates respectively having a through hole, a sleeve passing through the through holes and joining to one end of the torsion bar, and a projection projecting from the sleeve on the inside of the side wall plates. The projection has two lateral surfaces which come in contact with the side wall plates so as to prevent the sleeve from displacing in an axial direction.

The details as well as other features and advantages of this invention are set forth in the remainder of the specification and are shown in the accompanying drawings.

DESCRIPTION OF THE PREFERRED EMBODIMENTS

Figure 1:
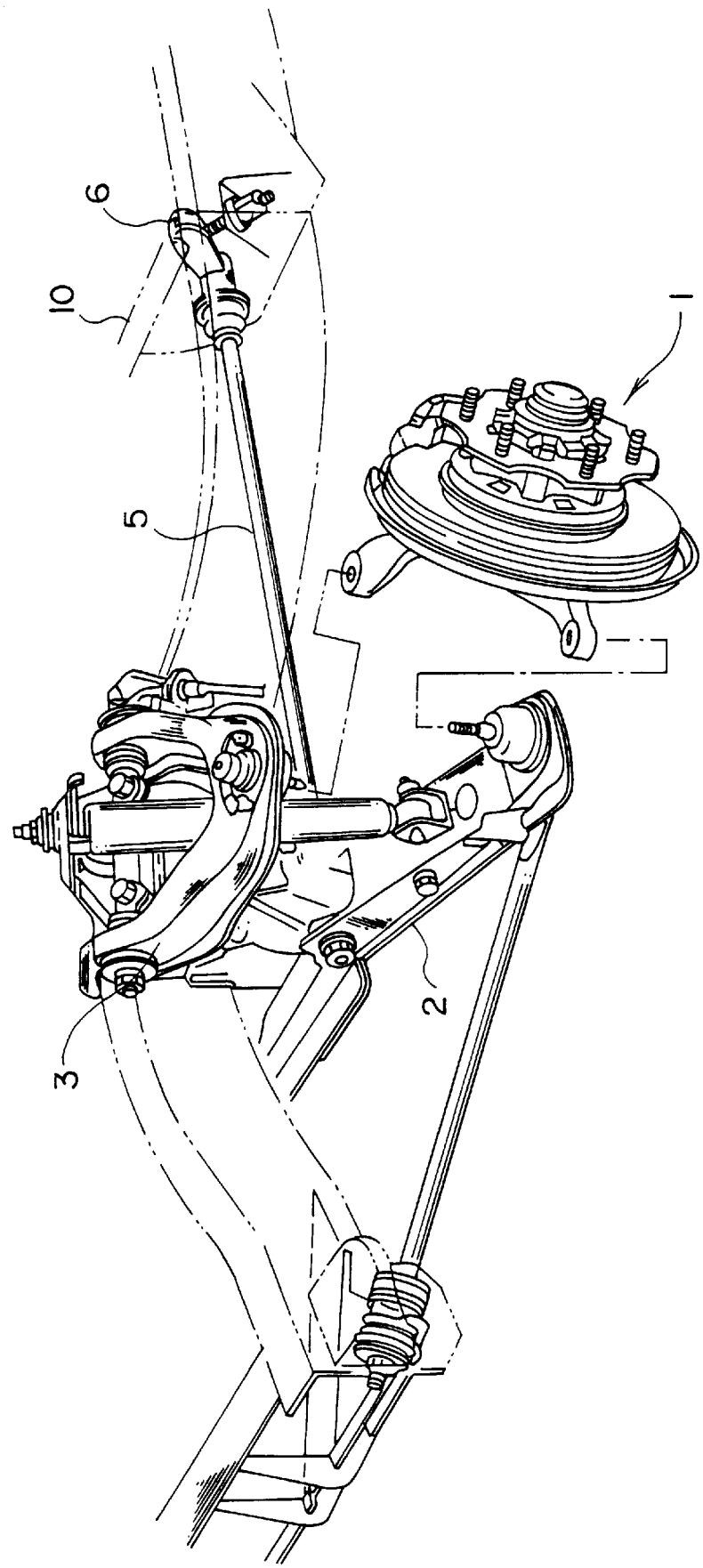
FIG. 1 is a perspective view of a vehicle suspension using an anchor arm according to a first embodiment of this invention.

Referring to FIG. 1 of the drawings an axle 1 is supported such that it can swing in an up/down direction via a suspension comprising a lower link 2 and an upper link 3. A front wheel of a vehicle, not shown, is attached to the axle 1.

The lower link 2 is connected to a torsion bar 5, and this torsion bar 5 twists according to the oscillation of the lower link 2 due to the up/down movement of the axle 1. In this way the torsion bar 5 confers elastic resistance to the up/down vibration of the axle 1.

Figure 4:
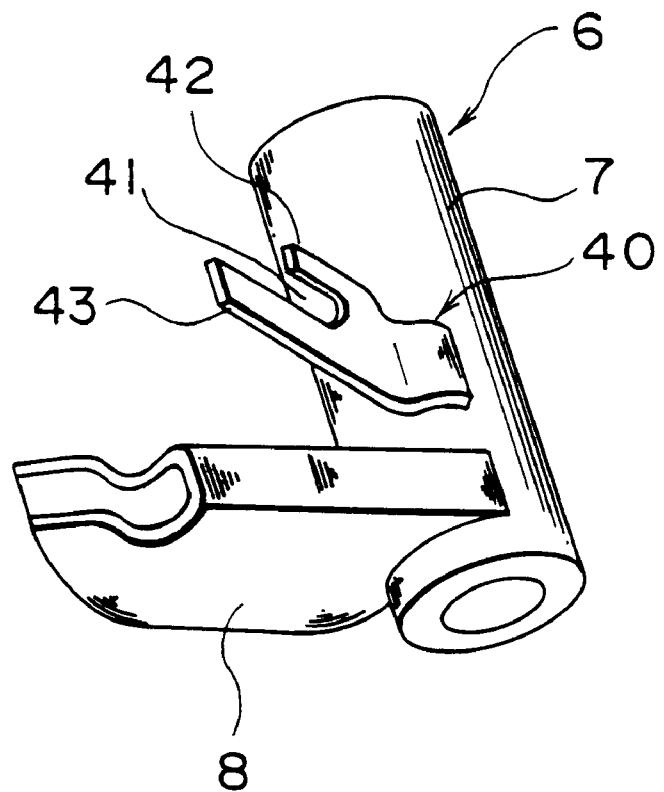
FIG. 4 is a perspective view of the anchor arm.

One end of the torsion bar 5 is fixed to a pivot point of the lower link 2, and the other end is joined to a cross member 10 of the vehicle body via an anchor arm 6 shown in FIG. 4.

Figure 2:
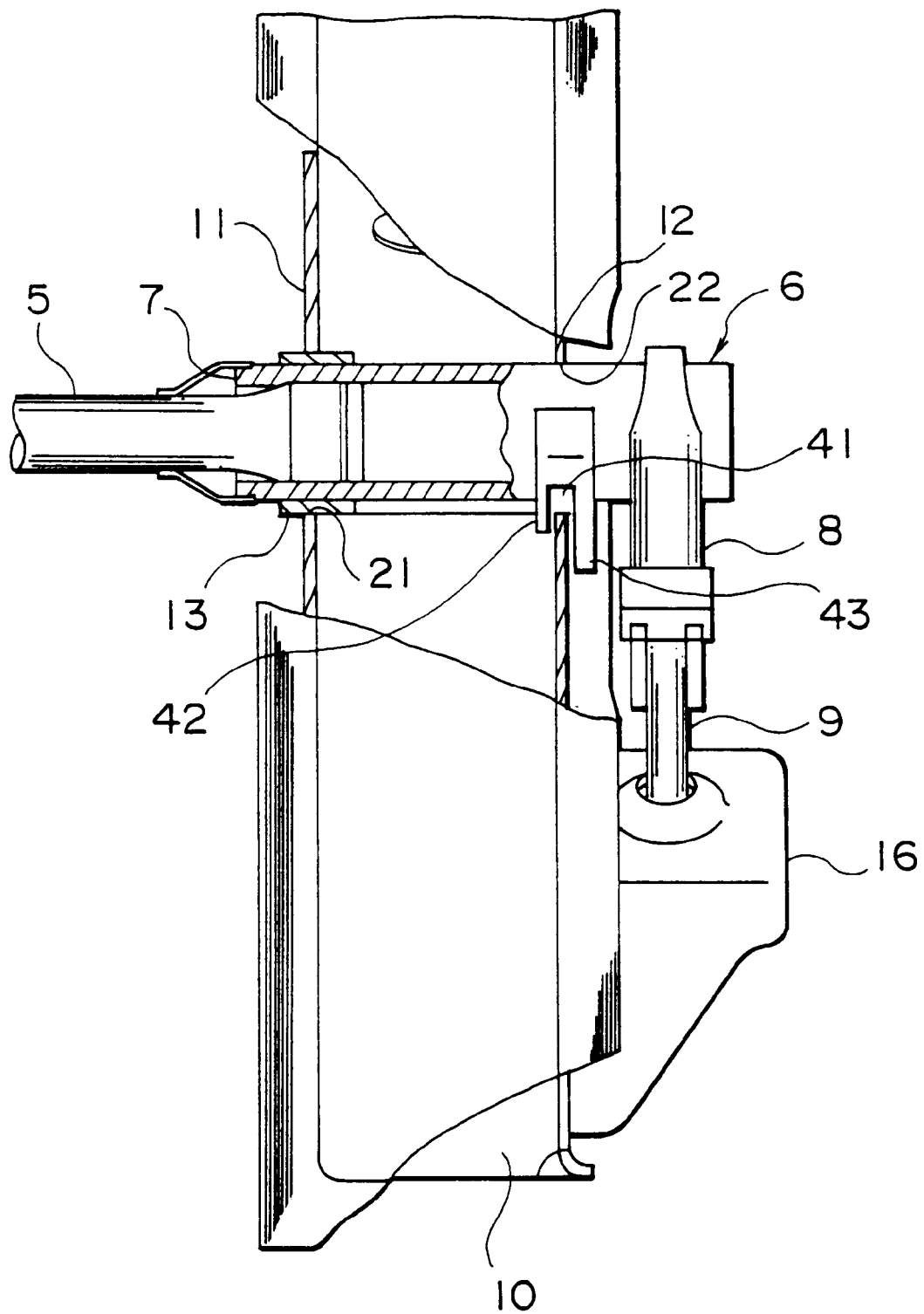
FIG. 2 is a plan view comprising a partial section of the anchor arm.

The anchor arm 6 comprises a sleeve 7 and an arm 8 projecting at a right angle from one end of the sleeve 7. The sleeve 7 passes through the cross member 10 as shown in FIG. 2. The cross member 10 comprises side wall plates 11, 12 which are arranged substantially parallel to one another.

The torsion bar 5 is inserted in the end of the sleeve 7 which has passed through the cross member 10. Hence the torsion bar 5, by engaging with the sleeve 7 via a serration or the like, limits rotation relative to the sleeve 7.

Figure 3:
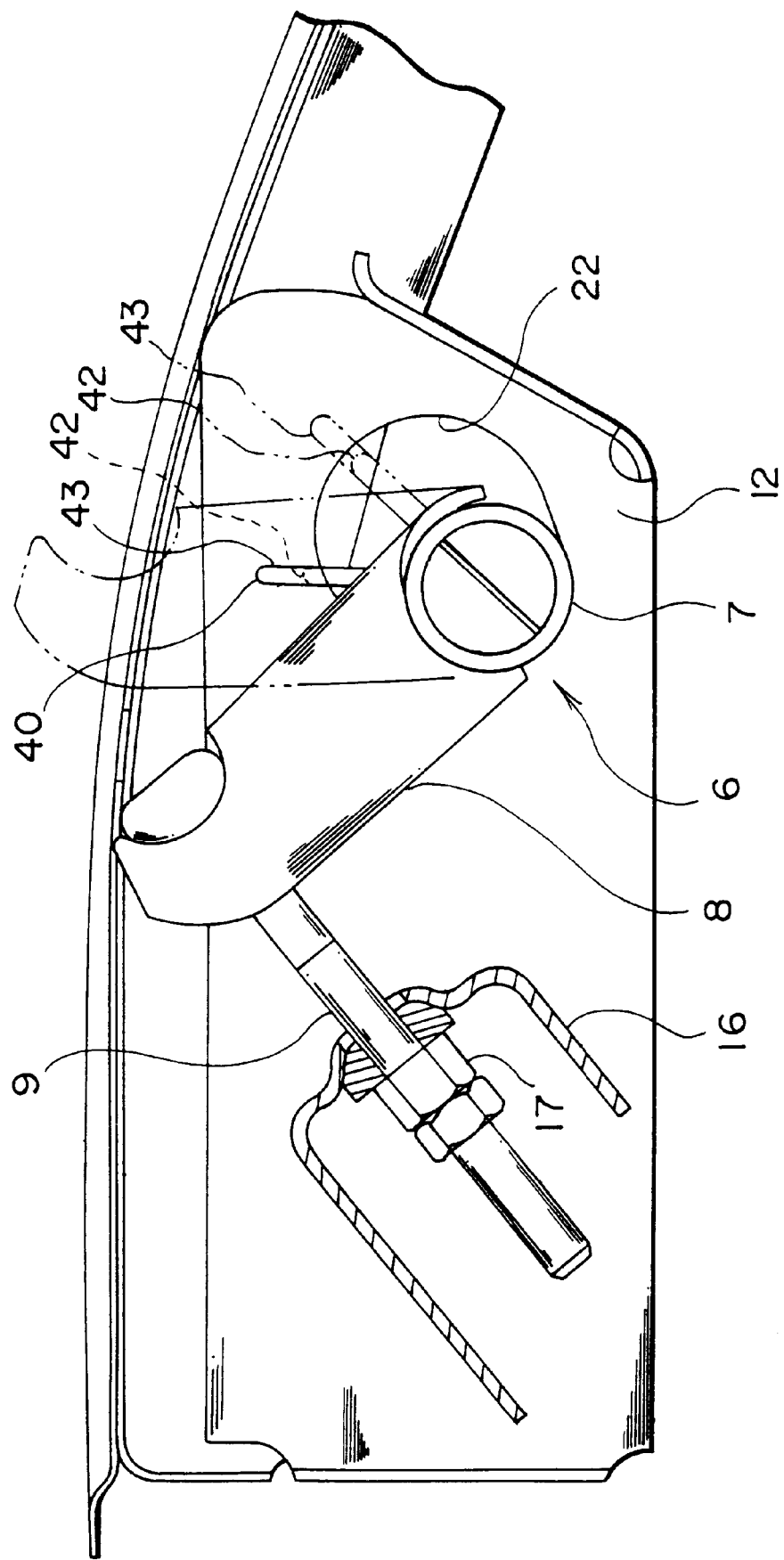
FIG. 3 is a lateral view of the anchor arm.

An anchor bolt 9 passes through the projecting end of the arm 8 as shown in FIG. 3. This anchor-bolt is fixed by a nut 17 to a bracket 16 which projects from the side wall plate 12 of the cross member 10.

The twist angle of the torsion bar 5, i.e. an initial load, is adjusted by varying the tightening position of this nut 17.

A positioning member 40 projects from an outer circumferential surface of the sleeve 7 as shown in FIG. 4. One end of this positioning member 40 is divided into two fork-shaped parts, i.e. a projection 43 which functions as a relatively long insert and a projection 42 which functions as a relatively short stop. These projections 43 and 42 are separated by a groove 41.

A through hole 22 is formed as shown in FIG. 3 in a side plate 12 of the cross member 10. The through hole 22 has a shape wherein a large arc is joined to a small arc by a straight line. The through hole 22 is formed with such dimensions that it allows the stop projection 42 but not the insertion projection 43 to pass through it.

A circular through hole 21 is formed in the side wall plate 11 of the cross member 10. A cylindrical guide 13 for guiding the sleeve 7 is inserted in this through hole. One part of the guide 13 reaches the through hole in the side wall plate 12.

When the anchor arm 6 is fitted to the cross member 10, the sleeve 7 is inserted in the through hole 22. The stop projection 42 penetrates the interior of the cross member 10 when the sleeve 7 passes through the through hole 22 at a first rotation position shown by the double dotted line in FIG. 3. However the insertion projection 43 cannot pass through the through hole 22. The sleeve is therefore passed through the cross member 10 until the insertion projection 43 comes in contact with the side wall plate 12.

In this position, the sleeve 7 is turned to the final rotation position shown by the solid line of FIG. 3, and the anchor-bolt 9 is fixed to the bracket 16 by the nut 17. A part of the side wall plate 12 thereby penetrates the groove 41.

Therefore when the anchor-bolt 9 is fixed, the positioning of the sleeve 7 in an axial direction by the projections 42, 43 is completed, and the bolt hole of the arm 8 and bolt hole of the bracket 16 are coaxial. The anchor-bolt 9 can therefore be easily inserted in these bolt holes. Regarding the load acting on the sleeve 7 tending to pull it towards the lower link 2, the insertion projection 43 comes in contact with the side wall plate 12 on the outside of the cross member 10, and regarding the load tending to push it in the opposite direction, the stop projection 42 comes in contact with the side wall plate 12 on the inside of the cross member 10. This prevents displacement of the sleeve 7 in an axial direction. There is therefore no need to provide another sleeve stop such as a snap ring, and no need to machine a groove in the sleeve to accommodate the snap ring.

Figure 5:
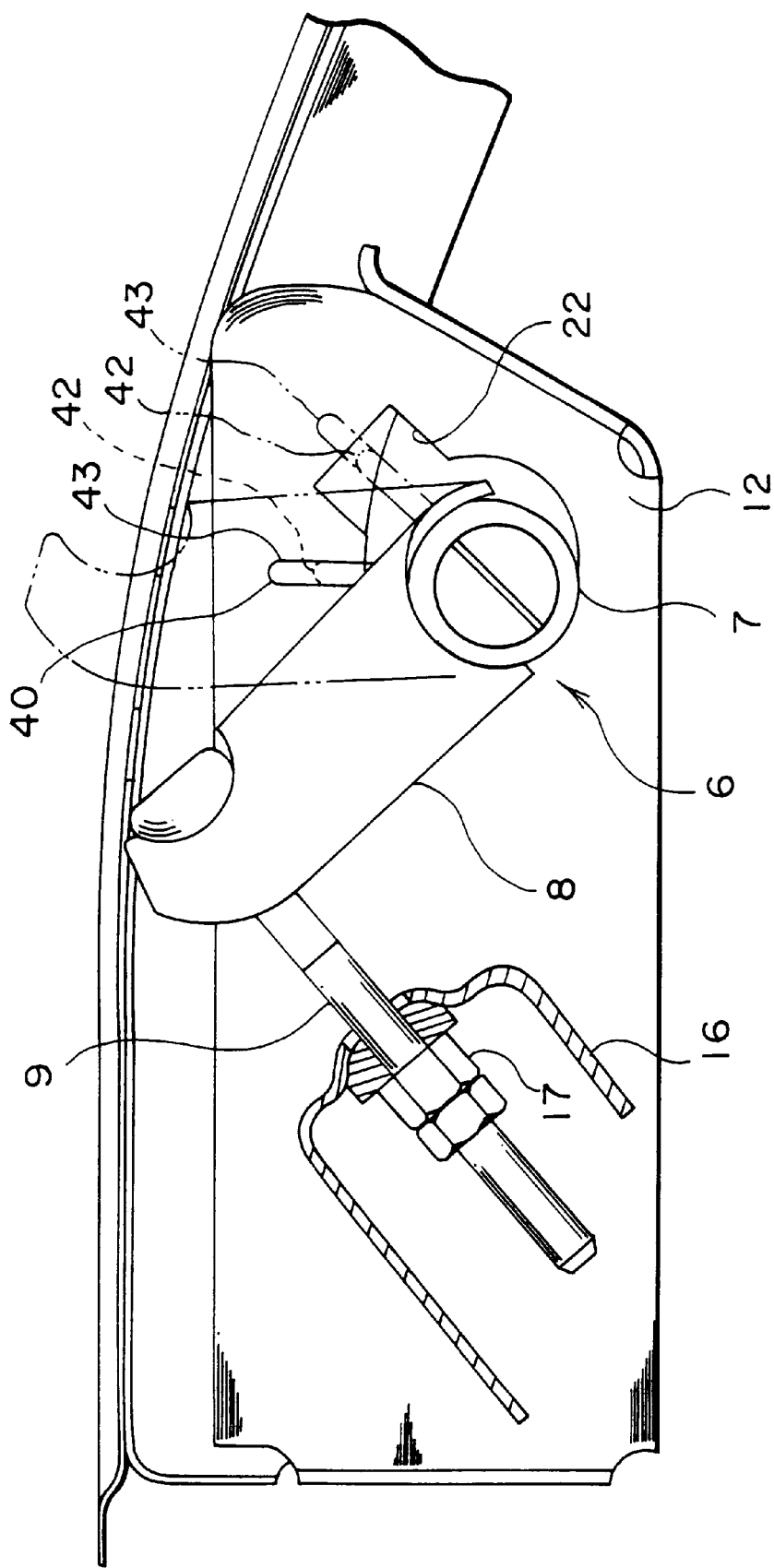
FIG. 5 is a lateral view of an anchor arm according to a second embodiment of this invention.

FIG. 5 shows a second embodiment of this invention relating to the shape of the through hole 22. Herein, the through hole 22 is formed in a keyhole shape by a combination of a rectangle and a circle.

Figure 6:
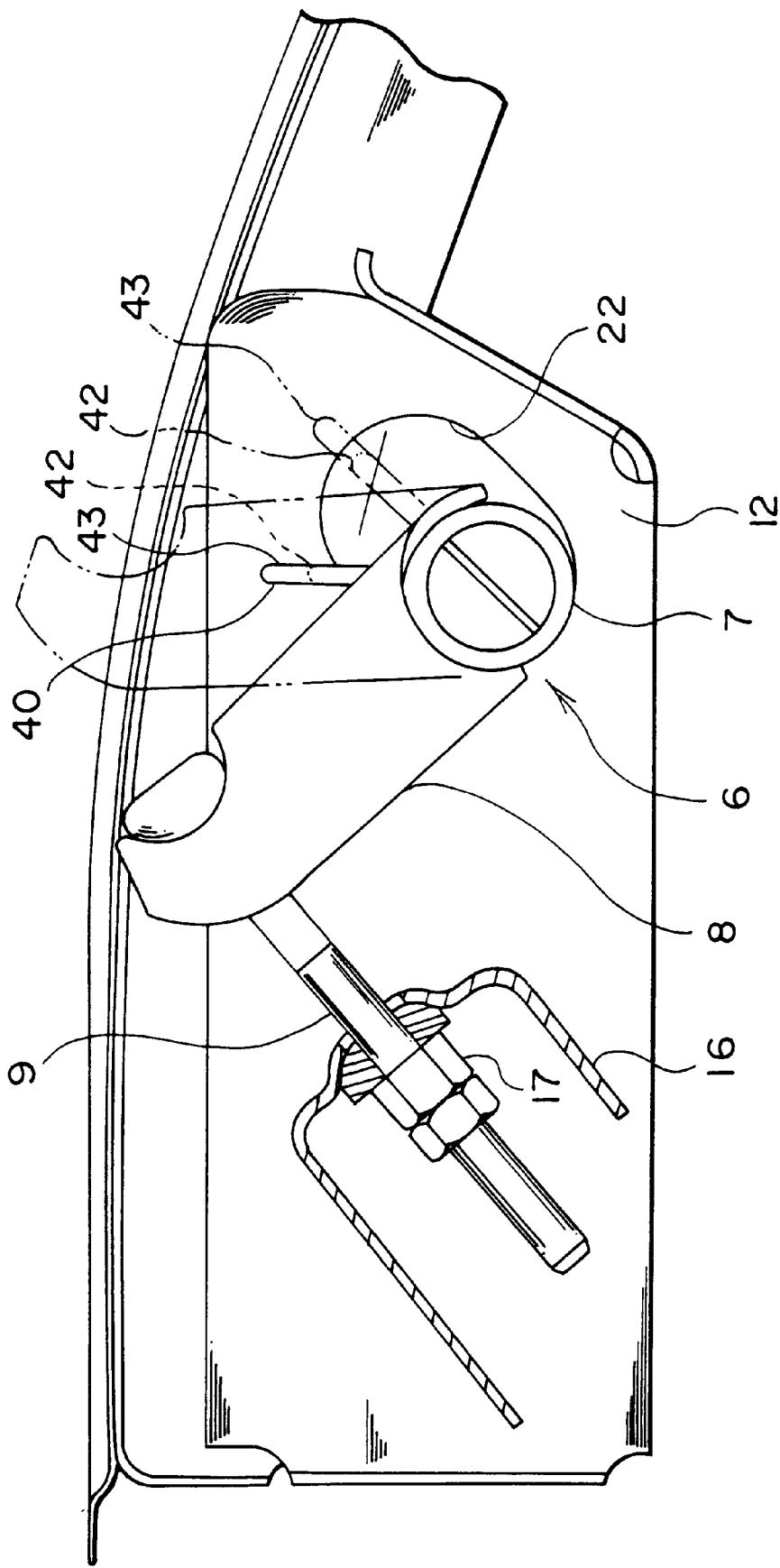
FIG. 6 is a lateral view of an anchor arm according to a third embodiment of this invention.

FIG. 6 shows a third embodiment of this invention relating to the shape of the through hole 22. Herein, the through hole 22 is formed as an ellipse.

In all of the above embodiments the maximum diameter of the through hole 22 is such as to allow the projection 42 but not the projection 43 to pass through it.

Figure 7:
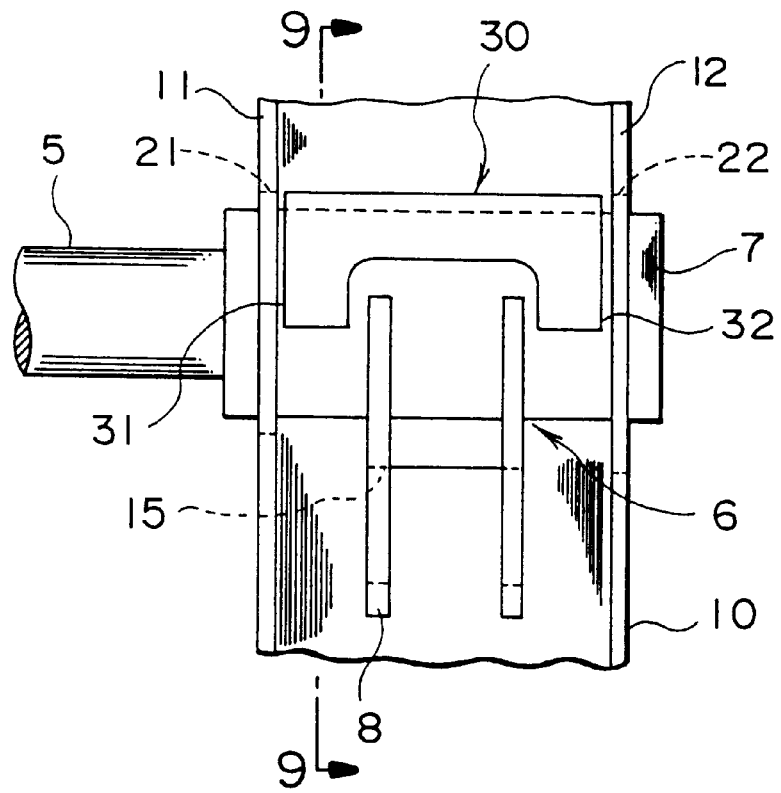
FIG. 7 is a plan view of an anchor arm according to a fourth embodiment of this invention as taken substantially along section line 7–7 in FIG. 9.
Figure 8:
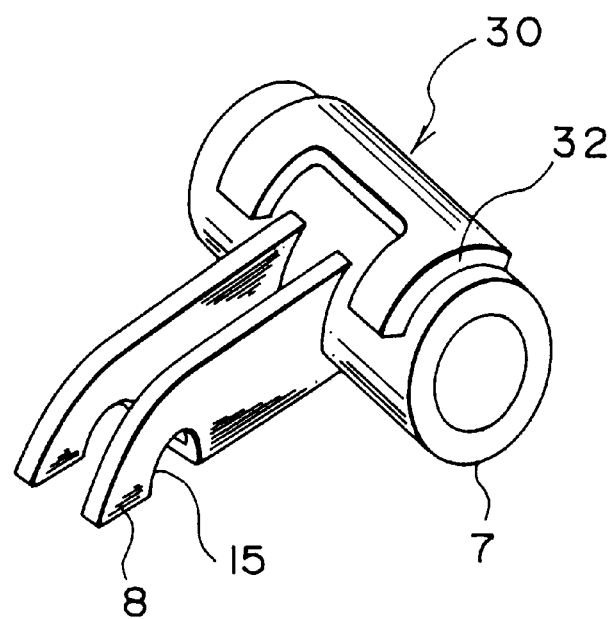
FIG. 8 is a perspective view of the anchor arm according to the fourth embodiment.
Figure 9:
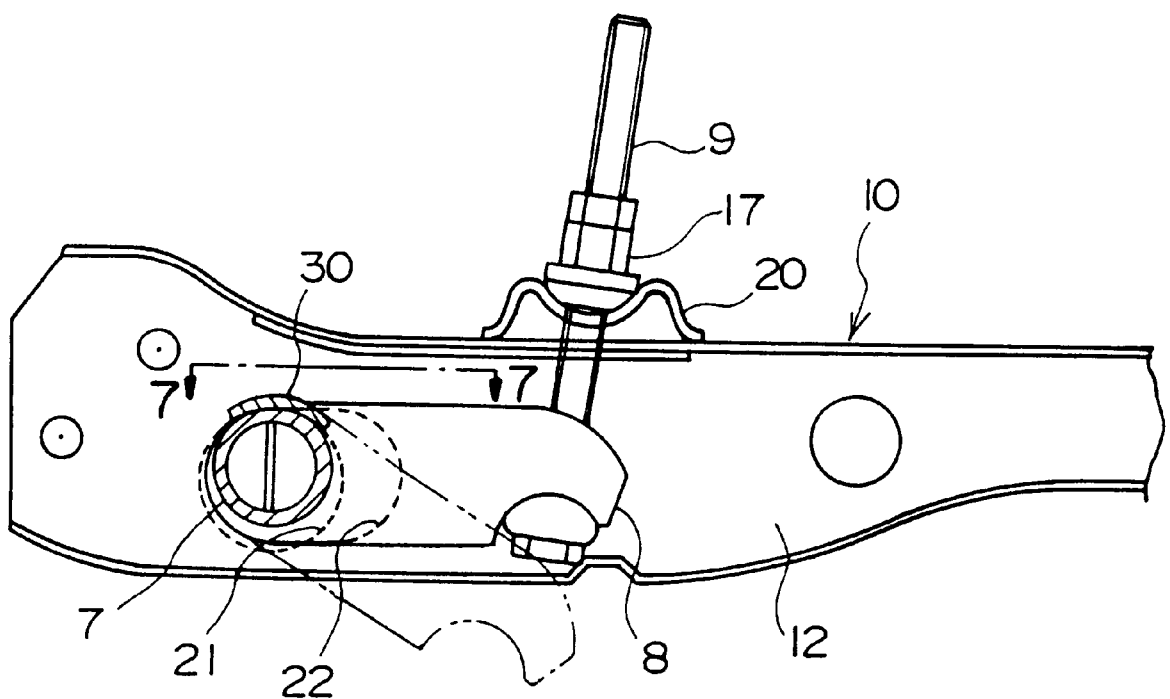
FIG. 9 is at lateral view of the anchor arm according to the fourth embodiment as taken substantially along line 9–9 in FIG. 7.

FIGS. 7–9 show a fourth embodiment of this invention.

According to this embodiment, a positioning part 30 having a large diameter is formed in one part of the sleeve 7 as shown in FIG. 7. The width of the positioning part 30 is slightly less than the distance between the side wall plates 11 and 12 of the cross member 10.

The arm 8 projects at a right angle from the central part of the sleeve 7. The sleeve 7 and the arm 8 are inserted in the cross member 10 via a downward opening of the cross member 10 at such an inclined state that the insertion of the sleeve 7 into the cross member 10 is not obstructed by the side wall plates 11 and 12. At this stage, the sleeve 7 is in an inclined position. The through hole 22 is formed on the side wall panel 12 as an ellipse. The through hole 21 is formed on the side wall plate 11 as a round shape the diameter of which is slightly larger than the shorter diameter of the through hole 22. The respective ends of the sleeve 7 is fitted one by one to the through hole 21 and 22.

After the ends of the sleeve 7 is inserted into the through holes 21 and 22, the position of the sleeve 7 is rotated from the first rotation position shown by the double dotted line in FIG. 9 to the final rotation position shown by the solid line in the figure. Then an anchor bolt 9 which engages with a notch 15 formed at an end of the arm 8 is fixed to a pedestal 20 by a nut 17. The pedestal 20 is located on the cross member 10 and the anchor bolt 9 is fitted such that its end projects upward through the top part of the cross member 10 and the pedestal 20 as shown in FIG. 9. The nut 17 is then fitted to the projecting end of the anchor bolt 9.

At this position, regarding the load acting on the sleeve 7 tending to pull it towards the lower link 2, a lateral surface 31 of the positioning part 30 comes in contact with the side wall plate 11 on the inside of the cross member 10, and regarding the load tending to push it in the opposite direction, the lateral surface 32 of the positioning part 30 comes in contact with the side wall plate 12 on the inside of the cross member 10. Displacement of the sleeve 7 In an axial direction is thereby prevented.

We claim:

1. A positioning structure and side wall assembly for joining a torsion bar to a vehicle body, comprising:

a sleeve for joining to one end of the torsion bar, a side wall plate fixed to the vehicle body, said side wall plate having a first side and a second side, said side wall plate defining a through hole therethrough, and first and second projections projecting from said sleeve, said first projection for positioning on said first side of said side wall plate and said second projection for positioning on said second side of said side wall plate in a final rotation position, said through hole dimensioned to allow passage of said first projection and to prevent passage of said second projection when said sleeve is positioned in a first rotation position relative to said side wall plate.

2. A positioning structure and side wall assembly as defined in claim 1, further comprising an arm projecting in a radial direction from an outer circumference of said sleeve, said arm being fixable to said side wall plate so as to prevent said sleeve from rotating.

3. A positioning structure and side wall assembly as defined in claim 1, wherein said first projection is shorter than said second projection.

4. A positioning structure and side wall assembly as defined in claim 1, wherein said first projection and said second projection form a fork shape and are separated by a groove.

5. A positioning structure and side wall assembly as defined in claim 2, wherein said first projection and said second projection are located at a different axial position along said sleeve than said arm.

6. A positioning structure and side wall assembly as defined in claim 1, wherein said through hole is noncircular.

7. A positioning structure and side wall assembly as defined in claim 1, wherein said through hole has a keyhole shape.

8. A positioning structure and side wall assembly as defined in claim 1, wherein said through hole has an elliptical shape.

9. A positioning structure and side wall assembly joining a torsion bar to a vehicle body, comprising:
- a pair of side wall plates fixed to the vehicle body, said side wall plates each having a through hole, a first of said through holes having a first shape and a second of said through holes having a second shape,
- a sleeve for extending through said through holes and for joining to one end of the torsion bar, and
- a projection projecting from said sleeve and being positionable between said side wall plates, said projection having two lateral surfaces,
- wherein said through holes are dimensioned such that, when said sleeve is in a first rotation position, said projection may pass through said first through hole but not said second through hole, and, when said sleeve is in a final rotation position, said two lateral surfaces of said projection come into contact with said side wall plates so as to prevent said sleeve from displacing in an axial direction.

10. A positioning structure and side wall assembly as defined in claim 9, wherein said first through hole is elliptical in shape, and said second through hole is circular in shape.

11. A positioning structure and side wall assembly as defined in claim 9, wherein said projection has a larger diameter than a remaining part of said sleeve.

12. A positioning structure and side wall assembly as defined in claim 11, further comprising an arm projecting in a radial direction from an outer surface of said positioning part of said sleeve.

13. A method of assembling a sleeve to a side wall plate of a vehicle body for joining a torsion bar attached to said sleeve to said vehicle body, the method comprising the steps of:
- providing first and second projections on said sleeve;
- providing a through hole in said side wall plate;
- inserting said sleeve and said first projection through said through hole of said side wall plate in a first rotation position, said second projection being prevented from passing through said through hole of said side wall plate at said first rotation position; and
- rotating said sleeve from said first rotation position to a final rotation position, said first and second projections being prevented from passing through said through hole of said side wall plate at said final rotation position.

14. A method of assembling a sleeve to two side wall plates of a vehicle body for joining a torsion bar attached to said sleeve to said vehicle body, the method comprising the steps of:
- providing a projection on said sleeve, said projection having lateral surfaces;
- providing a first through hole in one of said side wall plates and a second through hole of a different shape in the other of said side wall plates;
- fitting one end of said sleeve and a portion of said projection through said first through hole while said sleeve is at an inclined position;
- fitting the other end of said sleeve through said second through hole to position said sleeve between said side wall plates in a first rotation position; and
- rotating said sleeve from said first rotation position to a final rotation position, said lateral surfaces of said projection being prevented from passing through said first and second through holes at said final rotation position.

\* \* \* \* \*